United States Patent
Hosoi et al.

(10) Patent No.: US 11,139,495 B2
(45) Date of Patent: Oct. 5, 2021

(54) METHOD OF INSPECTING A FUEL CELL SYSTEM, AND THE FUEL CELL SYSTEM

(71) Applicant: HONDA MOTOR CO., LTD., Tokyo (JP)

(72) Inventors: Masaki Hosoi, Tokyo (JP); Hirokazu Ohara, Tokyo (JP); Yuji Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 781 days.

(21) Appl. No.: 15/451,591

(22) Filed: Mar. 7, 2017

(65) Prior Publication Data

US 2017/0263959 A1  Sep. 14, 2017

(30) Foreign Application Priority Data

Mar. 9, 2016 (JP) .............................. JP2016-045123

(51) Int. Cl.
*H01M 8/04664* (2016.01)
*H01M 8/0438* (2016.01)
*H01M 8/04089* (2016.01)
*H01M 8/04082* (2016.01)

(52) U.S. Cl.
CPC ..... *H01M 8/04664* (2013.01); *H01M 8/0438* (2013.01); *H01M 8/04089* (2013.01); *H01M 8/04201* (2013.01); *H01M 8/04388* (2013.01); *H01M 8/04679* (2013.01)

(58) Field of Classification Search
None
See application file for complete search history.

(56) References Cited

U.S. PATENT DOCUMENTS

| | | | |
|---|---|---|---|
| 7,127,937 B1 | 10/2006 | Thyroff | |
| 2006/0113128 A1 | 6/2006 | Sato et al. | |
| 2006/0246177 A1* | 11/2006 | Miki | H01M 8/04089 426/24 |
| 2009/0114284 A1* | 5/2009 | Siivonen | F15B 20/008 137/1 |
| 2009/0117420 A1 | 5/2009 | Nakakubo | |
| 2009/0283351 A1* | 11/2009 | Gannet | F17C 7/00 180/302 |
| 2011/0236779 A1 | 9/2011 | Nakanishi et al. | |
| 2012/0080251 A1 | 4/2012 | Ohashi | |

(Continued)

FOREIGN PATENT DOCUMENTS

| | | |
|---|---|---|
| JP | 2003-308865 | 10/2003 |
| JP | 2004-095425 | 3/2004 |

(Continued)

OTHER PUBLICATIONS

Canadian Office Action dated Apr. 12, 2018, 4 pages.

(Continued)

*Primary Examiner* — Brent A. Fairbanks
(74) *Attorney, Agent, or Firm* — Rankin, Hill & Clark LLP

(57) ABSTRACT

In a fuel cell system, an adhesion detection apparatus for detecting adhesion of a second switching valve for a sub tank is provided. The adhesion detection apparatus opens a first switching valve and a second switching valve for switching to a double switching valve open state where a fuel cell performs power generation, and thereafter, closes the first switching valve and opens the second switching valve for switching to a second switching valve open state where the fuel cell performs power generation, and detects adhesion of the second switching valve based on a change of a detection value of a pressure sensor in the second switching valve open state.

4 Claims, 4 Drawing Sheets

(56) References Cited

U.S. PATENT DOCUMENTS

| | | | | |
|---|---|---|---|---|
| 2012/0277984 A1* | 11/2012 | Maier | ............. | B60K 15/03006 |
| | | | | 701/115 |
| 2013/0149620 A1* | 6/2013 | Fabian | ............. | H01M 8/04373 |
| | | | | 429/416 |
| 2014/0109974 A1* | 4/2014 | Zoz | ............. | F17C 7/00 |
| | | | | 137/1 |
| 2014/0209179 A1 | 7/2014 | Maier et al. | | |
| 2016/0114793 A1* | 4/2016 | Saito | ............. | B60W 20/50 |
| | | | | 701/22 |
| 2016/0177857 A1* | 6/2016 | Sarikaya | ............. | F02M 21/0242 |
| | | | | 73/114.38 |

FOREIGN PATENT DOCUMENTS

| | | |
|---|---|---|
| JP | 2006-151130 | 6/2006 |
| JP | 2007-149423 | 6/2007 |
| JP | 2009-117191 | 5/2009 |
| JP | 2010-135214 | 6/2010 |
| JP | 2010-218904 | 9/2010 |
| JP | 2011-007229 | 1/2011 |
| JP | 2011-236930 | 11/2011 |
| JP | 2014-213817 | 11/2014 |

OTHER PUBLICATIONS

UK Search Report dated Sep. 25, 2017, 4 pages.
Japanese Office Action dated Aug. 1, 2017, partial English translation included, 5 pages.

* cited by examiner

METHOD OF INSPECTING A FUEL CELL SYSTEM, AND THE FUEL CELL SYSTEM

CROSS-REFERENCE TO RELATED APPLICATION

This application is based upon and claims the benefit of priority from Japanese Patent Application No. 2016-045123 filed on Mar. 9, 2016, the contents of which are incorporated herein by reference.

BACKGROUND OF THE INVENTION

Field of the Invention

The present invention relates to a method of inspecting a fuel cell system including a main tank and a sub tank for storing a fuel gas in which it is possible to detect adhesion of a switching valve (open/close valve) for the sub tank. Further, the present invention relates to the fuel cell system.

Description of the Related Art

Japanese Laid-Open Patent Publication No. 2004-095425 (hereinafter referred to as "JP2004-095425A") has an object of providing a failure diagnostic system for a supply switching valve (open/close valve) in which it is possible to quickly perform failure diagnosis of the supply switching valve at the time of start-up operation ([0004] and Abstract). In order to achieve the above object, in JP2004-095425A ([0005] and Abstract), a first switching valve 8 and a second switching valve 9 are provided in a fuel gas supply pipe 3 for supplying fuel gas from a fuel gas tank 2 to a fuel cell 1. Further, a first pressure sensor 6 for detecting the pressure of a fuel gas is provided between the first switching valve 8 and the second switching valve 9. Further, the system of JP2004-095424A includes a stop-period switching valve operation unit for closing the first switching valve 8, and then, the second switching valve 9 at the time of stopping operation, a stop-period storage processing unit for storing the output of the first pressure sensor 6 at the time of stopping operation, and a failure diagnostic unit for comparing the output of the first pressure sensor 6 at the time of stopping operation and the output of the first pressure sensor 6 at the time of restarting operation to analyze failures of the first switching valve 8 and the second switching valve 9.

JP 2004-095425A ([0006]) describes its operation and advantages as follows: Specifically, the pressure in a fuel supply pipe at the time of stopping a fuel cell is measured. At the time of restarting operation of the fuel cell, the pressure at the time of stopping operation of the fuel cell is compared with the pressure at the time of restarting operation of the fuel cell. Based on the comparison result, it is determined whether at least one of the first switching valve 8 and the second switching valve 9 has a failure. In this manner, it is possible to detect the failure without supplying the fuel gas to the fuel cell. Further, in order to perform the failure diagnosis, it is not necessary to wait until the vehicle starts to move or travels on roads. Therefore, it is possible to perform the failure diagnosis of the first switching valve and the second switching valve at the time of start-up operation.

U.S. Patent Application Publication No. 2012/0080251 (hereinafter referred to as "US2012/0080251 A1") discloses structure including a first tank 10 and a second tank 20 storing a reactant gas (fuel gas) to be supplied to a fuel cell FC (FIGS. 2 and 3 of US2012/0080251 A1).

SUMMARY OF THE INVENTION

In the structure of JP2004-095425A, the single tank 2 is provided, and failures of the two switching valves 8, 9 are detected. Unlike US2012/0080251 A1, no special consideration is given to structure including a plurality of fuel gas tanks.

For example, if a main tank having a large volume and a sub tank having a small volume are used as the plurality of fuel gas tanks, in some cases, this structure is advantageous in terms of minimizing the influence on the passenger compartment while maintaining the traveling distance. However, in the case of the fuel cell vehicle, the fuel economy could fluctuate in a range of about 30% depending on the loads (air conditioner, seat heater, defroster, etc.) used in the fuel cell vehicle. In particular, if the volume of the sub tank is 30% or less of the total volume of the main tank and the sub tank, it is difficult to identify whether the change in the fuel economy is due to the change in the used loads or malfunctioning of the switching valve for the sub tank.

In this regard, as a possible approach, it may be considered to provide a dedicated sensor (e.g., a pressure sensor in the sub tank) to determine whether the switching valve for the sub tank is operated normally. However, adoption of such an approach would worsen the fuel economy or increase the cost because of the increase in the vehicle weight. This problem lies also in fuel cell systems that are used other than for the fuel cell vehicle.

JP2004-095425A and US2012/0080251A1 do not include any considerations on such problems specific to the sub tank.

The present invention has been made taking the problem into consideration, and an object of the present invention is to provide a method of inspecting a fuel cell system, and provide the fuel cell system in which it is possible to detect failures or adhesion of a switching valve in a plurality of tanks (in particular, sub tank) storing a fuel gas.

An inspection method of a fuel cell system according to the present invention includes a fuel cell configured to perform power generation consuming a fuel gas, a fuel gas tank group made up of a main tank and a sub tank each configured to store the fuel gas, a supply channel configured to connect the main tank and the sub tank in parallel, and configured to supply the fuel gas from the main tank and the sub tank to the fuel cell, a first switching valve configured to supply and interrupt the fuel gas from the main tank, a second switching valve configured to supply and interrupt the fuel gas from the sub tank, a pressure sensor provided for the supply channel, being closer to the fuel cell than the second switching valve to detect the pressure of the fuel gas, and a switching valve control apparatus configured to control an open state and a closed state of the first switching valve and the second switching valve. The volume of the sub tank is 30% or less of the total volume of the main tank and the sub tank.

The method comprises the steps of: providing an adhesion detection apparatus for detecting adhesion of the second switching valve; detecting adhesion of the second switching valve based on a change of a detection value of the pressure sensor in a second switching valve open state where the first switching valve is closed, the second switching valve is opened, and the fuel cell generates power, after a double switching valve open state where the first switching valve is opened, the second switching valve is opened, and the fuel cell generates power.

In the present invention, adhesion of the second switching valve is detected based on the change in the detection value of the pressure sensor in the second switching valve open state following the double switching valve open state. Further, the pressure sensor is provided closer to the fuel cell than the second switching valve for the sub tank. Therefore, for example, the detection value of the pressure sensor for detecting the supply pressure (total pressure) from both of the main tank and the sub tank can be utilized also for detection of adhesion in the second switching valve for the sub tank. Accordingly, for example, an additional sensor for detecting the pressure inside the sub tank is not required, and it is possible to prevent the decrease in the fuel economy or increase in the cost due to the increase of the vehicle body weight.

Further, in the fuel cell system which does not have the additional pressure sensor, at the time of inspection to make sure that there is no adhesion in the second switching valve in the fuel cell system, for example, the external diagnostic machine may be used to finish the inspection by operating the adhesion detection apparatus externally (or the external diagnostic machine may be used as the adhesion detection apparatus). Therefore, for example, it becomes possible to omit the process of checking occurrence of adhesion of the second switching valve before attachment to the fuel cell system, and finish the inspection in a relatively short period of time.

Further, since occurrence of adhesion of the second switching valve is determined based on the pressure reduction speed in the second switching valve open state after the double switching valve open state, even in the case where the load is large, if the pressure reduction speed is higher than the pressure reduction speed in the pressure state where the system is operating normally and the load is high, it becomes possible to determine that adhesion of the second switching valve has occurred.

Alternatively, even in the case where the additional sensor is provided for the fuel cell system, it becomes possible to double-check occurrence of adhesion of the second switching valve, and achieve the excellent structure in terms of the fail safe operation.

The fuel cell system may discard the fuel gas and water remaining in the fuel cell during the double switching valve open state. Therefore, in the state where the remaining fuel gas and water are reduced, whether or not adhesion of the second switching valve has occurred is determined based on the change in the detection value of the pressure sensor in the second switching valve open state. Accordingly, in the second solenoid valve open state, consumption of the fuel gas supplied from the sub tank is facilitated, and the determination can be made accurately in a short period of time.

The supply channel may include a main tank side branch channel connected to the first switching valve, a sub tank side branch channel connected to the second switching valve, and a merging channel extending from a merging point of the main tank side branch channel and the sub tank side branch channel toward the fuel cell.

Further, a regulator configured to reduce the pressure of the fuel gas supplied from at least one of the main tank and the sub tank, and supply the fuel gas toward the fuel cell may be provided on the merging channel. Further, the pressure sensor may be provided between the regulator and the merging point of the main tank side branch channel and the sub tank side branch channel.

In the structure, it is possible to detect adhesion of the second switching valve based on the change in the pressure (detection value of the pressure sensor) of the fuel gas before pressure reduction by the regulator. Therefore, even if the regulator is operating in the second switching valve open state after the double switching valve open state, using a value of the pressure before pressure reduction, it becomes possible to quickly determine whether or not adhesion of the second switching valve has occurred.

A fuel cell system according to the present invention includes a fuel cell for performing power generation consuming a fuel gas, a fuel gas tank group made up of a main tank and a sub tank each configured to store the fuel gas, a supply channel configured to connect the main tank and the sub tank in parallel, and configured to supply the fuel gas from the main tank and the sub tank to the fuel cell, a first switching valve configured to supply and interrupt the fuel gas from the main tank, a second switching valve configured to supply and interrupt the fuel gas from the sub tank, and a pressure sensor provided for the supply channel closer to the fuel cell to detect the pressure of the fuel gas than the second switching valve. The volume of the sub tank is 30% or less of the total volume of the main tank and the sub tank. The fuel cell system further includes an adhesion detection apparatus configured to detect adhesion of the second switching valve based on a change of a detection value of the pressure sensor in the second switching valve open state where the first switching valve is closed, the second switching valve is opened, and the fuel cell generates power, after a double switching valve open state where the first switching valve is opened, second switching valve is opened, and the fuel cell generates power.

In the present invention, it becomes possible to detect failures or adhesion of the switching valve in the plurality of tanks (in particular, sub tank) storing the fuel gas.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. Embodiment

<A-1. Structure>
[A-1-1. Overall Structure>

Figure 1:
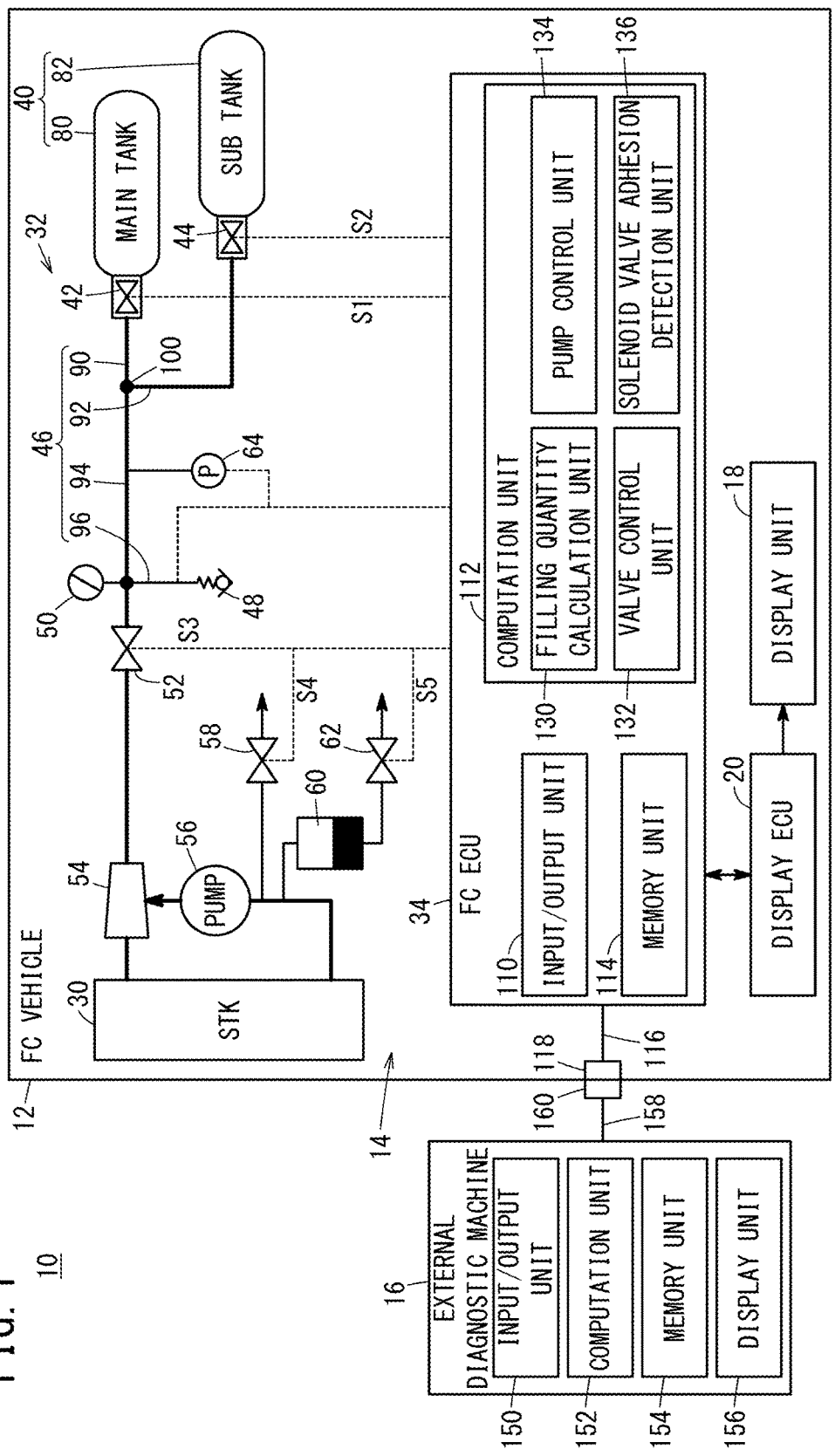
FIG. 1 is an overall structural diagram schematically showing a fuel cell system according to an embodiment of the present invention.

FIG. 1 is a diagram schematically showing overall structure of a fuel cell system 10 (hereinafter referred to as the "FC system 10") according to an embodiment of the present invention. As shown in FIG. 1, the FC system 10 includes a fuel cell vehicle 12 (hereinafter referred to as the "FC vehicle 12" or the "vehicle 12") equipped with a fuel cell unit 14 (hereinafter also referred to as the "FC unit 14"), and an external diagnostic machine 16. In addition to the fuel cell unit 14, the FC vehicle 12 includes a traction motor (not shown), a high voltage battery (not shown), a display unit 18, and a display electronic control unit 20 (hereinafter referred to as the "display ECU 20"), etc.

The FC unit 14 includes a fuel cell stack 30 (hereinafter referred to as the "FC stack 30", the "fuel cell 30", or the "FC 30"), an anode system 32, a cathode system (not shown), and an FC electronic control device 34 (hereinafter referred to as the "FC ECU 34" or the "ECU 34"). The anode system 32 supplies a fuel gas (hydrogen) to an anode of the FC stack 30. The cathode system supplies an oxygen-containing gas (air) containing oxygen to a cathode of the FC stack 30. The FC ECU 34 controls the entire FC unit 14.

[A-1-2. FC Stack 30]

The FC stack 30 performs power generation consuming a fuel gas (hydrogen) supplied from the anode system 32 and an oxygen-containing gas (air) supplied from the cathode system. For example, the FC stack 30 has structure where fuel cells (hereinafter referred to as the "FC cells") each including an anode, a cathode, and a solid polymer electrolyte membrane interposed between the anode and the cathode are stacked.

[A-1-3. Anode System 32]

(A-1-3-1. Overview of Anode System 32)

As described above, the anode system 32 supplies the fuel gas (hydrogen) to the anode of the FC stack 30. The anode system 32 includes a fuel gas tank group 40, a first solenoid valve 42, a second solenoid valve 44, a supply channel 46, a filling port 48, a regulator 50, a shut-off valve 52, an injector 54, a gas pump 56 (hydrogen pump), a purge valve 58, a catch tank 60, a drain valve 62, and a pressure sensor 64.

The fuel gas supplied from the fuel gas tank group 40 is supplied to the FC stack 30 through the supply channel 46. At this time, after the pressure of the fuel gas is reduced by the regulator 50, the fuel gas is injected by a nozzle of the injector 54 toward the FC stack 30. The residual fuel gas discharged from the FC stack 30 is returned to the injector 54 through the gas pump 56.

For example, at the time of stopping power generation by the FC stack 30, for discharging the fuel gas, the purge valve 58 is opened based on a drive signal (drive signal S4) from the ECU 34. After the fuel gas passes through the purge valve 58, the fuel gas is diluted in a dilution box (not shown), and then, discharged to the outside of the vehicle 12. Further, water produced during power generation by the FC stack 30 is collected by the catch tank 60, and discharged to the outside of the vehicle 12 when the drain valve 62 is opened, based on a drive signal (drive signal S5) from the ECU 34.

At the time of filling the fuel gas tank group 40 with the fuel gas from the outside of the vehicle 12, in the state where the shut-off valve 52 is closed based on a drive signal (drive signal S3) from the ECU 34, the fuel gas fills the fuel gas tank group 40 from the filling port 48.

(A-1-3-2. Fuel Gas Tank Group 40)

The fuel gas tank group 40 includes a main tank 80 and a sub tank 82. Each of the main tank 80 and the sub tank 82 stores the fuel gas. Assuming that a volume calculated by summing the volume L1 [$m^3$] of the main tank 80 and the volume L2 of the sub tank 82 is the total volume Lt of the FC system 10, the volume L1 of the main tank 80 is 70% of the total volume Lt or more, and the volume L2 of the sub tank 82 is 30% or less of the total volume Lt.

(A-1-3-3. First Solenoid Valve 42 and Second Solenoid Valve 44)

The first solenoid valve 42 (first switching valve (open/close valve)) supplies or interrupts the supply of the fuel gas from the main tank 80 based on a control signal (drive signal S1) from the ECU 34. The first solenoid valve 42 according to the embodiment of the present invention is an in-tank solenoid valve provided in the main tank 80. Likewise, the second solenoid valve 44 (second switching valve) supplies or interrupts the supply of the fuel gas from the sub tank 82 based on a control signal (drive signal S2) from the ECU 34. The second solenoid valve 44 according to the embodiment of the present invention is an in-tank solenoid valve provided in the sub tank 82.

(A-1-3-4. Supply Channel 46)

The supply channel 46 supplies the fuel gas from the main tank 80 and the sub tank 82 to the fuel cell 30. The supply channel 46 includes a main tank side branch channel 90, a sub tank side branch channel 92, a merging channel 94, and a filling port branch channel 96. The main tank side branch channel 90 is connected to the first solenoid valve 42, and the sub tank side branch channel 92 is connected to the second solenoid valve 44. The merging channel 94 extends from a merging point 100 of the main tank side branch channel 90 and the sub tank side branch channel 92 toward the fuel cell 30. The filling port branch channel 96 connects the filling port 48 and the merging channel 94. By providing the main tank side branch channel 90 and the sub tank side branch channel 92, the main tank 80 and the sub tank 82 can be connected in parallel to the supply channel 46.

The regulator 50, the shut-off valve 52, and the pressure sensor 64 are provided on the merging channel 94. The filling port 48 is connected to the merging channel 94 through the filling port branch channel 96.

(A-1-3-5. Regulator 50)

The regulator 50 reduces the pressure of the fuel gas supplied from at least one of the main tank 80 and the sub tank 82 to a predetermined value, and supplies the fuel gas toward the fuel cell 30. That is, the regulator 50 controls the pressure on the downstream side (pressure of the hydrogen on the anode side) in response to the pressure of the air on the cathode side (pilot pressure) supplied through a pipe (not shown). Therefore, the pressure of the fuel gas on the anode side is linked to the pressure of the air on the cathode side. When the rotation number, etc. of an air pump (not shown) in the cathode system is changed for changing the oxygen concentration, the pressure of the fuel gas on the anode side is changed as well.

(A-1-3-6. Pressure Sensor 64)

The pressure sensor 64 is provided in the supply channel 46, being closer to the fuel cell 30 than the second solenoid valve 44, for detecting the pressure P (hereinafter referred to as the "detection value P", the "pressure detection value P", or the "anode side pressure P"), and outputting the pressure P to the ECU 34. In the embodiment of the present invention, the pressure sensor 64 is provided between the regulator 50 and the merging point 100 of the main tank side branch channel 90 and the sub tank side branch channel 92.

The detection value P of the pressure sensor 64 of the embodiment of the present invention is used by the ECU 34, at the time of normal power generation for controlling power generation of the FC stack 30 during traveling of the vehicle 12, at the time of filling the fuel gas tank group 40 with the fuel gas, and at the time of determining occurrence of adhesion of the second solenoid valve 44.

Specifically, for example, the detection value P at the time of normal power generation is used for detection of the total filling quantity Qt of the fuel gas in the main tank 80 and the sub tank 82, and detection of abnormality when power generation is performed by the FC stack 30. The total filling quantity Qt is the sum value of the filling quantity Q1 of the fuel gas in the main tank 80 and the filling quantity Q2 of the fuel gas in the sub tank 82. For example, in the case where power generation is performed by the FC stack 30 when both of the first solenoid valve 42 and the second solenoid valve 44 are in the open state, and the shut-off valve 52 is in the open state, the total filling quantity Qt of the main tank 80 and the sub tank 82 is proportional to the pressure detection value P. Therefore, by using the detection value P, it is possible to detect the total filling quantity Qt.

Further, for example, the detection value P at the time of supplying the fuel gas is used for detection of the total filling quantity Qt of the fuel gas in the main tank 80 and the sub tank 82, and detection of leakage of the fuel gas in the supply channel 46. For example, in the case where both of the first solenoid valve 42 and the second solenoid valve 44 are opened and the shut-off valve 52 is closed, and the fuel gas is supplied from the filling port 48, the total filling quantity Qt of the main tank 80 and the sub tank 82 is proportional to the pressure detection value P. Therefore, using the detection value P, it is possible to detect the total quantity Qt at the time of filling the fuel gas.

The detection value P at the time of determining occurrence of adhesion of the second solenoid valve 44 will be described later with reference to FIGS. 3 and 4.

[A-1-4. FC ECU 34]

(A-1-4-1. Overview of FC ECU 34)

The FC ECU 34 (adhesion detection apparatus) controls the entire FC unit 14. For example, the ECU 34 controls the output of the FC 30 based on an FC output instruction from an integrated electronic control device (integrated ECU, not shown). Further, the ECU 34 implements solenoid valve adhesion detection control for detecting adhesion of the second solenoid valve 44 (hereinafter also referred to as the "adhesion detection control"). The adhesion detection control will be described with reference to FIGS. 3 and 4.

As shown in FIG. 1, the FC ECU 34 includes an input/output unit 110, a computation unit 112, and a memory unit 114 as hardware. The input/output unit 110 handles input/output of data between the ECU 34 and the other devices (e.g., external diagnostic machine 16, display ECU 20). Communication with the external diagnostic machine 16 is performed through a communication line 116 and a connector 118. The computation unit 112 includes a central processing unit (CPU), and controls the FC unit 14 using programs and data stored in the memory unit 114. For example, based on the output value from each sensor, the ECU 34 controls opening/closing of the first solenoid valve 42 and the second solenoid valve 44. The memory unit 114 may comprise a volatile memory and/or non-volatile memory, and stores various programs and data used in the computation unit 112.

(A-1-4-2. Details of Computation Unit 112)

The computation unit 112 includes a filling quantity calculation unit 130, a valve control unit 132 (switching valve control device), a pump control unit 134, and a solenoid valve adhesion detection unit 136.

The filling quantity calculation unit 130 calculates the total filling quantity Qt of the main tank 80 and the sub tank 82 based on the detection value P of the pressure sensor 64. The valve control unit 132 controls opening/closing of the first solenoid valve 42, the second solenoid valve 44, the shut-off valve 52, the purge valve 58, and the drain valve 62. The pump control unit 134 controls the output of the gas pump 56. The solenoid valve adhesion detection unit 136 implements the solenoid valve adhesion detection control (see FIGS. 3 and 4).

[A-1-5. Display Unit 18 and Display ECU 20]

The display unit 18 displays predetermined information based on an instruction from the display ECU 20. The predetermined information in the embodiment of the present application includes information regarding the presence of adhesion in the second solenoid valve 44 and information regarding the total filling quantity Qt of the fuel gas tank group 40. Further, the predetermined information may include information regarding fuel economy of the vehicle 12. As the display unit 18, for example, a meter display unit, a navigation device monitor, or a head-up display may be used. The display ECU 20 displays predetermined information on the display unit 18 based on an instruction from the FC ECU 34.

[A-1-6. External Diagnostic Machine 16]

The external diagnostic machine 16 instructs the ECU 34 to perform adhesion detection control, and receives the result of the adhesion detection control from the ECU 34. As shown in FIG. 1, the external diagnostic machine 16 includes an input/output unit 150, a computation unit 152, a memory unit 154, and a display unit 156 as hardware.

The input/output unit 150 handles input/output of data between the external diagnostic machine 16 and in-vehicle devices (e.g., FC ECU 34). Communication with the in-vehicle devices is performed through a communication line 158 and a connector 160. The computation unit 152 includes a central processing unit (CPU), and controls the external diagnostic machine 16 using programs and data stored in the memory unit 154. For example, based on the control input from the operator through the input/output unit 150, the computation unit 152 instructs the FC ECU 34 to implement adhesion detection control. The memory unit 154 may comprise a volatile memory and/or non-volatile memory, and stores various programs and data used in the computation unit 152.

<A-2. Adhesion Detection Control>

[A-2-1. Detection Principle of Solenoid Valve Adhesion Detection Control]

Figure 2:
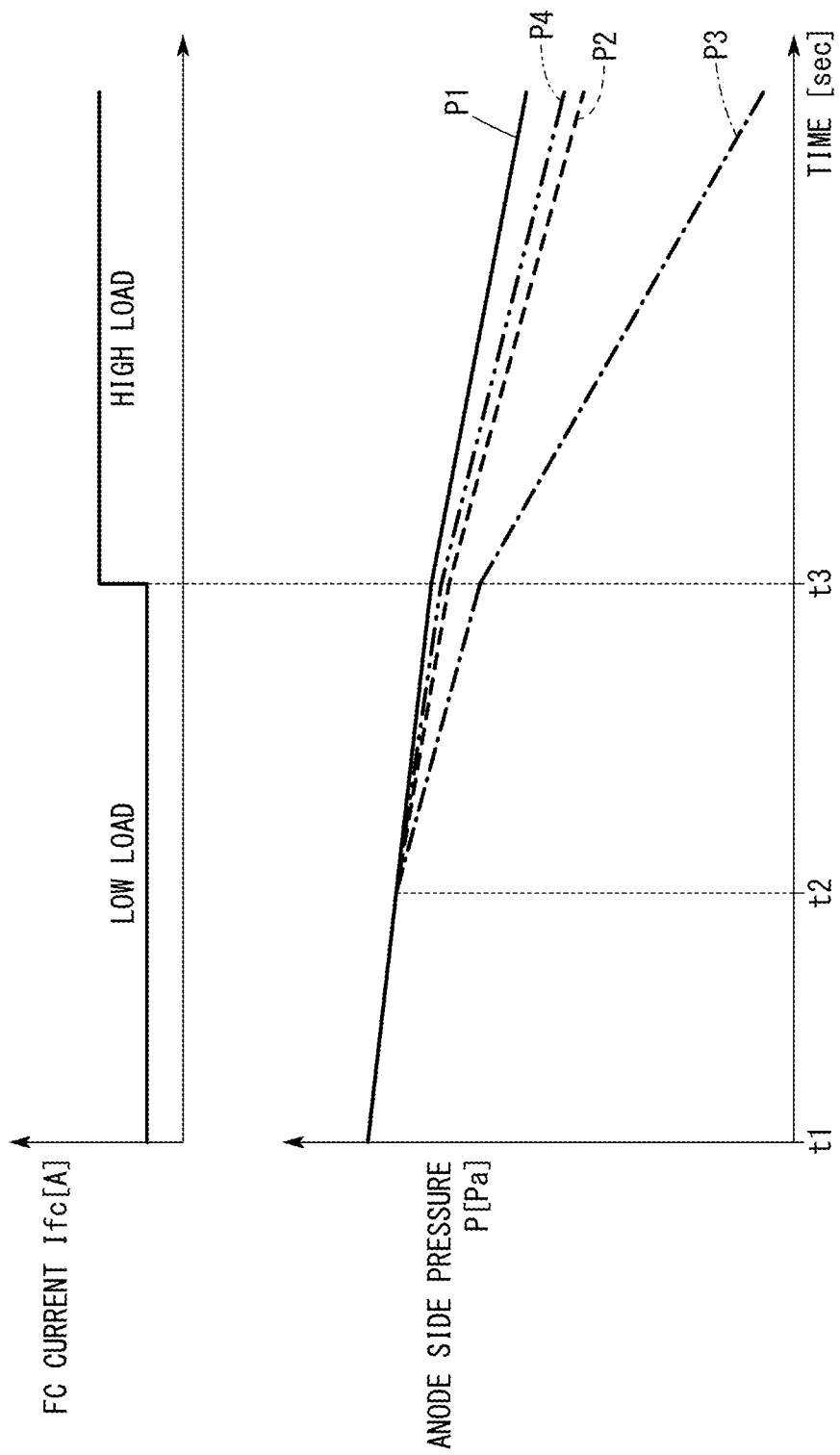
FIG. 2 is a graph showing a detection principle of solenoid valve adhesion detection control according to the embodiment.

FIG. 2 is a diagram for explaining a detection principle of solenoid valve adhesion detection control according to the embodiment of the present invention. The vertical axis of FIG. 2 represents output current Ifc of the fuel cell 30 (hereinafter also referred to as the "FC current Ifc") [A], and the anode side pressure P detected by the pressure sensor 64. The horizontal axis represents the time.

FIG. 2 shows P1, P2, P3, and P4 as the pressure P. The pressure P1 is an example of the pressure P in the case where the first solenoid valve 42 and the second solenoid valve 44 are operating normally, and the load of the auxiliary device is small. The pressure P2 is an example of the pressure P in the case where the first solenoid valve 42 and the second solenoid valve 44 are operating normally, and the load of the auxiliary device is large. The pressure P3 is an example of the pressure P in the case where adhesion of the first solenoid valve 42 occurs. The pressure P4 is an example of the pressure P in the case where adhesion of the second solenoid valve 44 occurs. In FIG. 2, the vehicle 12 starts traveling at time t2.

In FIG. 2, during the time period from time t1 to time t3, since the load is low, the FC current Ifc is small. After time t3, since the load is high, the FC current Ifc becomes large.

As described above, the volume L1 of the main tank 80 is 70% of the total volume Lt or more, and the volume L2 of the sub tank 82 is 30% or less of the total volume Lt. Further, in the embodiment of the present invention, the FC ECU 34 determines the remaining quantity of the fuel gas (total filling quantity Qt) based on the pressure P detected by the pressure sensor 64.

In the adhesion detection control, in the state where the first solenoid valve 42, the second solenoid valve 44, and the shut-off valve 52 are opened (hereinafter also referred to as the "double solenoid valve open state"), the fuel gas is supplied from both of the main tank 80 and the sub tank 82 to the fuel cell 30 for performing power generation in the fuel cell 30. At this time, the detection value of the pressure sensor 64 shows the pressure P of the fuel gas from both of the main tank 80 and the sub tank 82.

Thereafter, in the state where the first solenoid valve 42 is closed and the second solenoid valve 44 and the shut-off valve 52 are opened (hereinafter also referred to as the "second solenoid valve open state"), the fuel gas is supplied only from the sub tank 82 to the fuel cell 30 for performing power generation in the fuel cell 30. At this time, the detection value of the pressure sensor 64 shows the pressure P of the fuel gas from only the sub tank 82.

Even if the ECU 34 issues an instruction for switching to the second solenoid valve open state, in the case where adhesion of the second solenoid valve 44 occurs, the fuel gas is supplied to the supply channel 46 from neither the main tank 80 nor the sub tank 82. In this case, in the double solenoid valve open state, only the fuel gas supplied from the main tank 80 remains in the supply channel 46. In this state, when the power generation is performed in the fuel cell 30, the fuel gas in the supply channel 46 is decreased sharply. Accordingly, the pressure P is decreased sharply as well. Therefore, it becomes possible to detect occurrence of adhesion of the second solenoid valve 44 based on the pressure reduction speed ΔP [Pa/sec].

As described above, since the volume L2 of the sub tank 82 is 30% or less of the total volume Lt of the sub tank 82, the pressure P4 when adhesion of the second solenoid valve 44 for the sub tank 82 occurs is positioned between the pressures P1 and P2 that are pressures when the first solenoid valve 42 and the second solenoid valve 44 are operating normally. Therefore, even in the case where an attempt to determine occurrence of adhesion of the second solenoid valve 44 is made based simply on the pressure reduction speed ΔP, it may not be possible to distinguish the occurrence of adhesion from the case where the load of the auxiliary device is large. In this regard, in the embodiment of the present invention, solenoid valve adhesion detection control is used. In this manner, even in the case where the load of the auxiliary device is large, it becomes possible to determine occurrence of adhesion of the second solenoid valve 44.

[A-2-2. Specific Details of Solenoid Valve Adhesion Detection Control]

Figure 3:
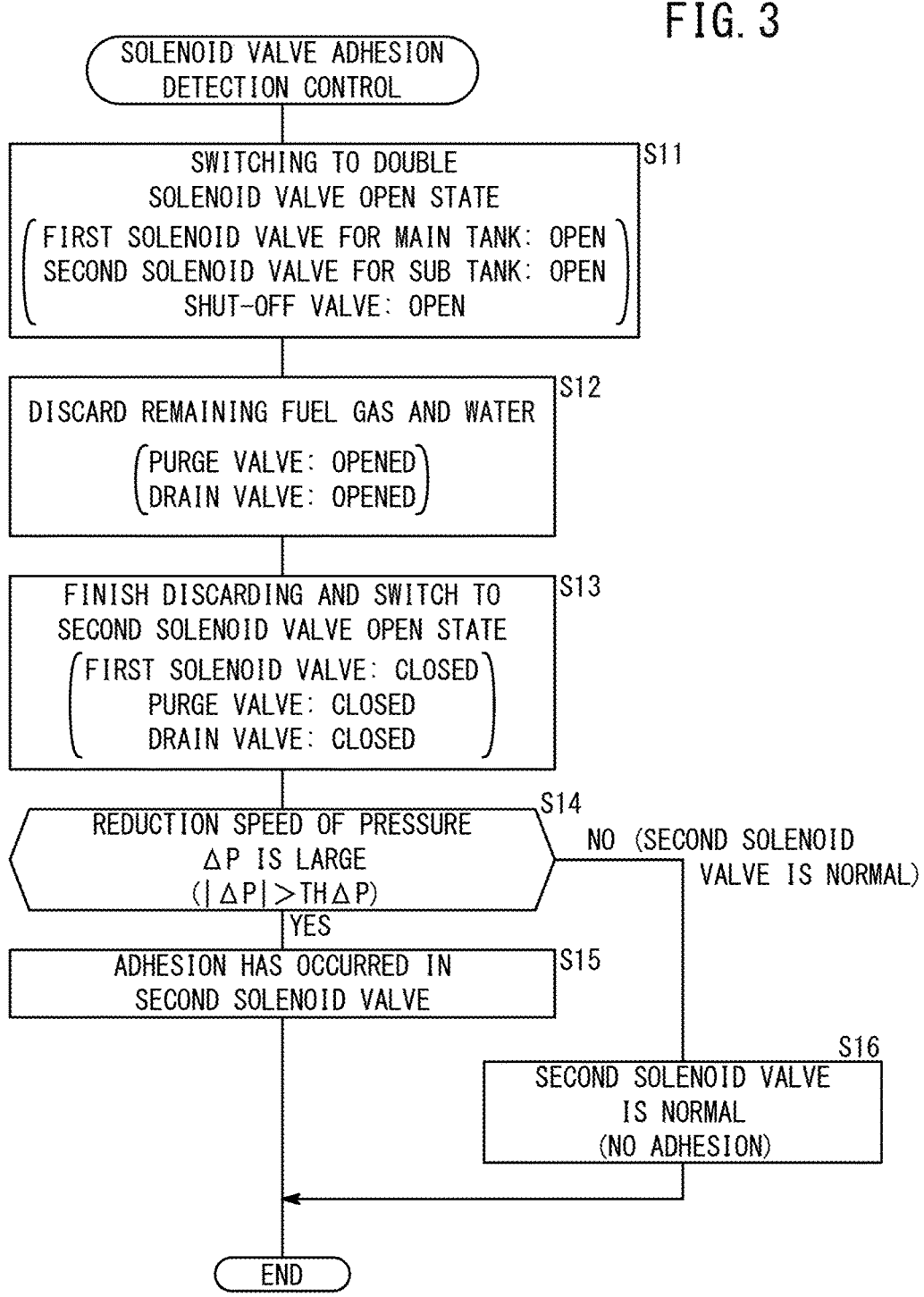
FIG. 3 is a flow chart of the solenoid valve adhesion detection control according to the embodiment.

FIG. 3 is a flow chart showing solenoid valve adhesion control according to the embodiment of the present invention. FIG. 4 is a time chart showing the solenoid valve adhesion detection control according to the embodiment of the present invention. In the state where the external diagnostic machine 16 is connected to the vehicle 12, the ECU 34 performs the adhesion detection control based on an instruction from the external diagnostic machine 16. Alternatively, the adhesion detection control may be performed by the ECU 34 at predetermined timing during traveling or stopping of the vehicle 12.

Figure 4:
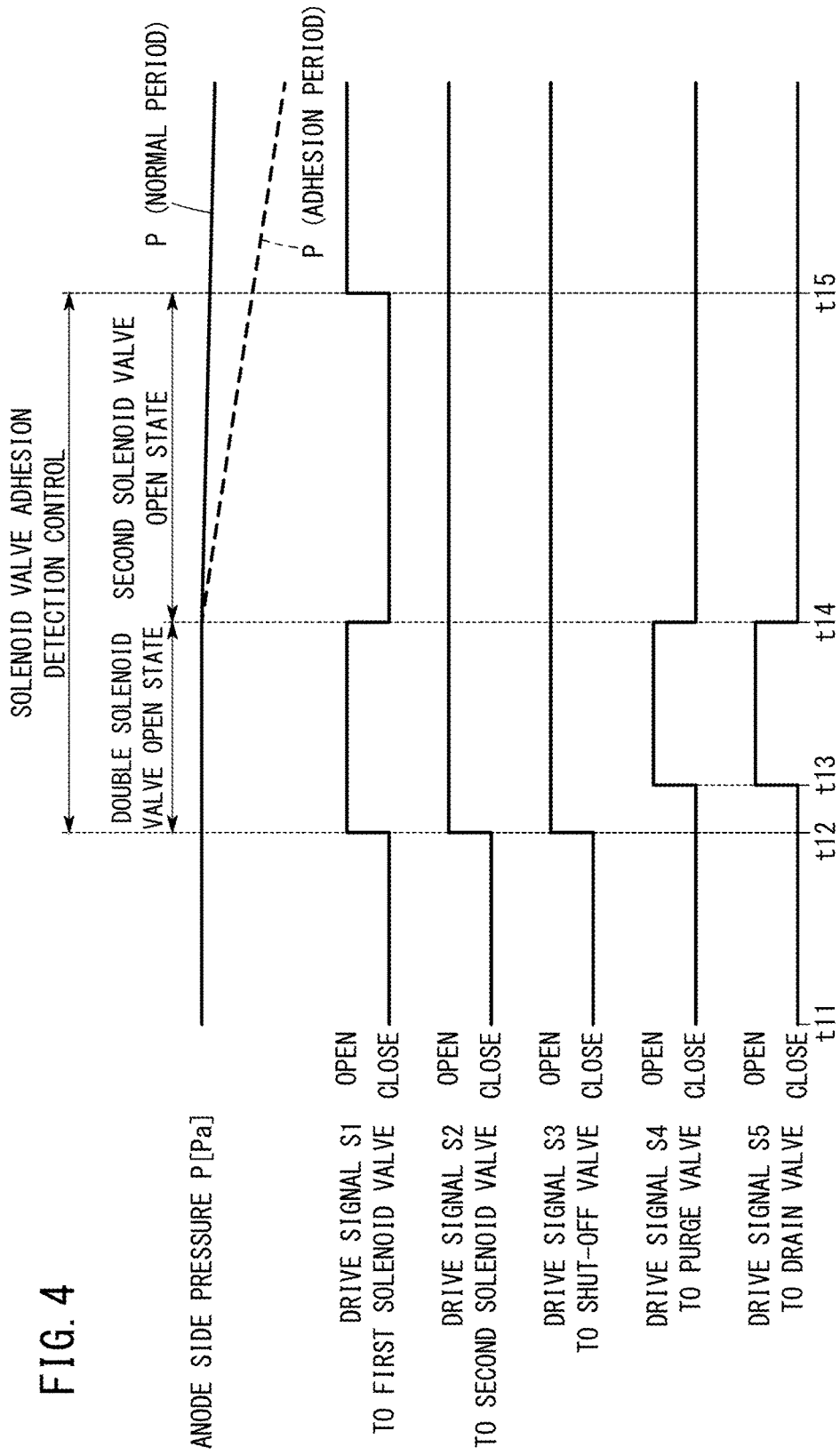
FIG. 4 is a time chart of the solenoid valve adhesion detection control according to the embodiment.

The vertical axis of FIG. 4 shows the anode side pressure P, the drive signal S1 to the first solenoid valve 42, the drive signal S2 to the second solenoid valve 44, the drive signal S3 to the shut-off valve 52, the drive signal S4 to the purge valve 58, and the drive signal S5 to the drain valve 62. Further, with regard to the pressure P of FIG. 4, the pressure P of a solid line indicates a normal state (where adhesion of the second solenoid valve 44 does not occur) and the pressure of a broken line indicates an abnormal state (where adhesion of the second solenoid valve 44 occurs).

In FIG. 4, the time period from time t11 to time t12 is the state before starting the adhesion detection control. For example, an operation start switch (not shown) (ignition switch) of the vehicle 12 is switched from the OFF state to the ON state. The external diagnostic machine 16 is connected to provide an instruction to start the adhesion detection control. At time t12, the adhesion detection control is started. This control continues until time t15.

In step S11 of FIG. 3, the FC ECU 34 switches the operation to the double solenoid valve open state (time t12 in FIG. 4). As a result, the ECU 34 transmits the drive signals S1, S2, and S3 (ON signals) to the first solenoid valve 42, the second solenoid valve 44, and the shut-off valve 52, respectively to open the first solenoid valve 42, the second solenoid valve 44, and the shut-off valve 52. Therefore, the fuel gas is supplied from both of the main tank 80 and the sub tank 82 to the fuel cells 30. Additionally, the ECU 34 outputs a drive signal (ON signal) to a water pump (not shown) in the cathode system as well. In this manner, the water pump is operated to supply the oxygen-containing gas to the cathode of the FC 30. As a result, the fuel cell 30 starts power generation.

In step S12, the FC ECU 34 discards the fuel gas and the water remaining on the anode side. Specifically, the ECU 34 sends the drive signals S4, S5 (ON signals) to the purge valve 58 and the drain valve 62 to open the purge valve 58 and the drain valve 62 (time t13 in FIG. 4). Therefore, the remaining fuel gas is released from the purge valve 58, and the remaining water is released from the drain valve 62.

In step S13, the FC ECU 34 finishes discarding of the fuel gas and the water for switching to the second solenoid valve open state (time t14 in FIG. 4). As a result, the ECU 34 stops transmission of the drive signals S1, S4, and S5 to the first solenoid valve 42, the purge valve 58, and the drain valve 62 to close the first solenoid valve 42, the purge valve 58, and the drain valve 62. In this regard, transmission of the drive signals S2 and S3 to the second solenoid valve 44 and the shut-off valve 52 continues (transmission of the drive signal to the water pump also continues). Thus, supply of the fuel gas from the main tank 80 is stopped, and the fuel gas is supplied only from the sub tank 82 to the fuel cell 30. Therefore, the fuel cell 30 continues power generation.

In step S14, the ECU 34 determines whether the pressure reduction speed ΔP is large or not. Specifically, the ECU 34 determines whether or not the absolute value |ΔP| of the reduction speed ΔP exceeds a reduction speed threshold value THΔP. The reduction speed threshold value THΔP is a threshold value for determining occurrence of adhesion of the second solenoid valve 44.

If the reduction speed ΔP of the pressure P is large (S14: YES), in step S15, the ECU 34 determines that adhesion has occurred in the second solenoid valve 44. In this case, the ECU 34 notifies the occurrence of adhesion of the second solenoid valve 44 to the external diagnostic machine 16. After receiving this notification, the external diagnostic machine 16 displays the information on the display unit 156. Alternatively, the ECU 34 may display the information indicating the occurrence of adhesion of the second solenoid valve 44 on the display unit 18 through the display ECU 20.

If the reduction speed ΔP of the pressure P is not large (S14: NO), in step S16, the ECU 34 determines that adhesion of the second solenoid valve 44 has not occurred, and that the second solenoid valve 44 is operating normally. In this case, the ECU 34 notifies the external diagnostic machine 16 that the second solenoid valve 44 is operating normally. Upon receiving this notification, the external diagnostic machine 16 displays the information on the display unit 156. Alternatively, the ECU 34 may display the information that the second solenoid valve 44 is operating normally, on the display unit 18 through the display ECU 20.

Alternatively, in the case where solenoid valve adhesion control is performed during normal traveling of the vehicle 12, no information may be displayed specifically.

In the case of an example of FIG. 4, thereafter, the ECU 34 switches the operation to the double solenoid valve open state again, and the fuel cell 30 performs normal power generation (time t15 in FIG. 4).

<A-3. Advantage of the Embodiment>

As described above, in the embodiment of the present invention, adhesion of the second solenoid valve 44 is detected based on the change in the detection value P of the pressure sensor 64 in the second solenoid valve open state (second switching valve open state) following the double solenoid valve open state (double switching valve open state) (FIG. 3 and FIG. 4). Further, the pressure sensor 64 is provided closer to the fuel cell 30 than the second solenoid valve 44 for the sub tank 82 (FIG. 1). Therefore, for example, the detection value P of the pressure sensor 64 for detecting the supply pressure (total pressure) from both of the main tank 80 and the sub tank 82 can be utilized also for detection of adhesion in the second solenoid valve 44 for the sub tank 82. Accordingly, for example, an additional sensor for detecting the pressure inside the sub tank 82 is not required, and it is possible to prevent the decrease in the fuel economy or increase in the cost due to the increase of the vehicle body weight.

Further, in the FC system 10 which does not have the additional pressure sensor, at the time of inspection to make sure that there is no adhesion of the second solenoid valve 44 in the FC system 10, for example, the external diagnostic machine 16 may be used to finish the inspection by operating the FC ECU 34 (adhesion detection apparatus) externally. Therefore, for example, it becomes possible to omit the process of checking occurrence of adhesion of the second solenoid valve 44 before attachment to the FC system 10, and finish the inspection in a relatively short period of time.

Further, since occurrence of adhesion of the second solenoid valve 44 is determined based on the pressure reduction speed ΔP in the second solenoid valve open state after the double solenoid open state, even in the case where the load is large (in the case of the load corresponding to the pressure P2 in FIG. 2), if the pressure reduction speed ΔP of the pressure P is higher than the pressure reduction speed of the pressure P2 where the system is operating normally and the load is high, it becomes possible to determine that adhesion of the second solenoid valve 44 has occurred.

Alternatively, even in the case where the additional sensor is provided for the FC system 10, it becomes possible to double-check occurrence of adhesion of the second solenoid valve 44, and achieve an excellent structure from a fail-safe point of view.

In the embodiment of the present invention, the FC unit 14 discards the fuel gas and the water remaining inside the fuel cell 30 during the double solenoid valve open state (S12 of FIG. 3 and t13 to t14 of FIG. 4). Therefore, in the state where the remaining fuel gas and water are reduced, whether or not adhesion of the second solenoid valve 44 has occurred is determined based on the change in the detection value P of the pressure sensor 64 in the second solenoid valve open state. Accordingly, in the second solenoid valve open state, consumption of the fuel gas supplied from the sub tank 82 is facilitated, and the determination can be made in a short period of time.

In the embodiment of the present invention, the supply channel 46 includes the main tank side branch channel 90 connected to the first solenoid valve 42, the sub tank side branch channel 92 connected to the second solenoid valve 44, and the merging channel 94 extending from the merging point 100 of the main tank side branch channel 90 and the sub tank side branch channel 92 toward the fuel cell 30 (FIG. 1).

Further, the regulator 50 is provided on the merging channel 94. The regulator 50 reduces the pressure P of the fuel gas supplied from at least one of the main tank 80 and the sub tank 82, and supplies the fuel gas toward the fuel cell 30 (FIG. 1). Further, the pressure sensor 64 is provided between the merging point 100 of the main tank side branch channel 90 and the sub tank side branch channel 92, and the regulator 50 (FIG. 1).

In the structure, it is possible to detect adhesion of the second solenoid valve 44 based on the change in the pressure P (detection value P of the pressure sensor 64) of the fuel gas before pressure reduction by the regulator 50. Therefore, even if the regulator 50 is operating in the second solenoid valve open state after the double solenoid valve open state, using the pressure P before pressure reduction, it becomes possible to quickly determine whether or not adhesion of the second solenoid valve 44 has occurred.

B. Modified Embodiment

It should be noted that the present invention is not limited to the above embodiment. Various structures can be adopted based on the description of the specification. For example, the present invention may adopt the following structure.

<B-1. Application of the FC System>

In the above embodiment, the FC system 10 is applied to the FC vehicle 12. However, the present invention is not limited in this respect. For example, the FC system 10 may be mounted in another object having at least two fuel tanks (combination of the main tank 80 and the sub tank 82, etc.). For example, the FC system 10 may be used for movable objects such as ships or aircrafts.

<B-2. Structure of FC System 10>

[B-2-1. First Solenoid Valve 42 and Second Solenoid Valve 44]

In the above embodiment, the in tank solenoid valve is used as the first solenoid valve 42 (FIG. 1). However, present invention is not limited in this respect, e.g., in terms of supply, and interruption of the supply of the fuel gas from the main tank 80. For example, the first solenoid valve 42 may be provided in the main tank side branch channel 90. Likewise, the second solenoid valve 44 may be provided in the sub tank side branch channel 92.

[B-2-2. Pressure Sensor 64]

In the embodiment of the present invention, the pressure sensor 64 is provided in the merging channel 94. The merging channel 94 extends from the merging point 100 of the main tank side branch channel 90 and the sub tank side branch channel 92, toward the fuel cell 30 (FIG. 1). However, the present invention is not limited, e.g., in terms of detection of the pressure point P of the fuel gas from the main tank 80 and the sub tank 82. Stated otherwise, the present invention is not limited as long as the pressure sensor 64 is closer to the fuel cell 30 than the second solenoid valve 44 as viewed from the sub tank 82 at a reference position. For example, the pressure sensor 64 may be provided in the main tank side branch channel 90 or the sub tank side branch channel 92.

In the above embodiment, the pressure sensor 64 is provided between the merging point 100 and the regulator 50 (FIG. 1). However, the present invention is not limited, e.g., in terms of detecting the pressure P of the fuel gas from the main tank 80 and the sub tank 82. Stated otherwise, the present invention is not limited as long as the pressure sensor 64 is provided closer to the fuel cell 30 than the second solenoid valve 44 as viewed from the sub tank 82 at a reference position. For example, the pressure sensor 64 may be provided closer to the fuel cell 30 than the regulator 50.

<B-3. Adhesion Detection Control>

In the above embodiment, adhesion of the second solenoid valve 44 is detected using only the detection value P of the pressure sensor 64 provided in the merging channel 94 (FIGS. 3 and 4). However, the present invention is not limited to this embodiment, e.g., from a fail-safe point of view. An additional pressure sensor (second pressure sensor) may be provided closer to the sub tank 82 (or may be provided in the sub tank 82) than the second solenoid valve 44, and adhesion of the second solenoid valve 44 may be detected using the detection value of the second pressure sensor in addition to the detection value of the pressure sensor 64.

In the above embodiment, the adhesion detection control is performed by the FC ECU 34 (FIGS. 1 and 3). However, the present invention is not limited in terms of detecting adhesion of the second solenoid valve 44. For example, adhesion detection control may be performed by the external diagnostic machine 16 instead of the FC ECU 34 or in addition to the FC ECU 34.

In the adhesion detection control of the above embodiment, in the double solenoid valve open state, the remaining fuel gas and water are discarded (S12 of FIG. 3 and t13 to t14 of FIG. 4). However, the present invention is not limited in terms of detecting adhesion of the second solenoid valve 44 by switching to the second solenoid valve open state after the double solenoid valve open state. For example, in the double solenoid valve open state, at least one of the remaining fuel gas and water may not be discarded.

C. Description of Reference Numerals

12: fuel cell system
30: fuel cell
34: FC ECU (adhesion detection apparatus)
40: fuel gas tank group
42: first solenoid valve (first switching valve)
44: second solenoid valve (second switching valve)
46: supply channel
50: regulator
64: pressure sensor
80: main tank
82: sub tank
90: main tank side branch channel
92: sub tank side branch channel
94: merge channel
100: merging point
132: valve control unit (switching valve control unit)
L1: volume of main tank
L2: volume of sub tank
Lt: total volume
P: detection value of pressure sensor

What is claimed is:

1. A method of inspecting a fuel cell system, the fuel cell system comprising:
   a fuel cell configured to perform power generation consuming a fuel gas;
   a main tank and a sub tank each configured to store the fuel gas;
   a supply channel configured to connect the main tank and the sub tank in parallel, and configured to supply the fuel gas from the main tank and the sub tank to the fuel cell;
   a first switching valve configured to supply and interrupt the fuel gas from the main tank;
   a second switching valve configured to supply and interrupt the fuel gas from the sub tank;
   a pressure sensor provided for the supply channel, being closer to the fuel cell than the second switching valve to detect the pressure of the fuel gas; and
   a fuel cell electronic control device with a switching valve control apparatus configured to control an open state and a closed state of the first switching valve and the second switching valve;
   wherein a volume of the sub tank is less than a volume of the main tank and the volume of the sub tank is 30% or less of a total volume of the main tank and the sub tank;
   the method comprising the step of:
   providing the fuel cell electronic control device with an adhesion detection apparatus configured to detect adhesion of the second switching valve;
   detecting adhesion in the closed state of the second switching valve based on a change of a detection value of the pressure sensor in a second switching valve open state immediately following a double switching valve open state, where in the second switching valve open state the first switching valve is closed in response to an OFF signal from the switching valve control apparatus, the second switching valve is opened in response to an ON signal from the switching valve control apparatus, and the fuel cell generates power, and where in the double switching valve open state the first switching valve is opened and the second switching valve is opened in response to an ON signal from the switching valve control apparatus, and the fuel cell generates power.

2. The inspection method according to claim 1, wherein the fuel cell system discards the fuel gas and water remaining in the fuel cell during the double switching valve open state, after the fuel cell starts generating power until switching valve control goes to the second switching valve open state.

3. The inspection method according to claim 1, wherein the supply channel includes:
   a main tank side branch channel connected to the first switching valve;
   a sub tank side branch channel connected to the second switching valve; and
   a merging channel extending from a merging point of the main tank side branch channel and the sub tank side branch channel toward the fuel cell,
   wherein a regulator is provided on the merging channel, the regulator being configured to reduce the pressure of the fuel gas supplied from at least one of the main tank and the sub tank, and supply the fuel gas toward the fuel cell;
   the pressure sensor is provided between the regulator and the merging point of the main tank side branch channel and the sub tank side branch channel.

4. A fuel cell system comprising:
   a fuel cell for performing power generation consuming a fuel gas;
   a main tank and a sub tank each configured to store the fuel gas;

a supply channel configured to connect the main tank and the sub tank in parallel, and configured to supply the fuel gas from the main tank and the sub tank to the fuel cell;

a first switching valve configured to supply and interrupt the fuel gas from the main tank;

a second switching valve configured to supply and interrupt the fuel gas from the sub tank; and a pressure sensor provided for the supply channel closer to the fuel cell than the second switching valve to detect the pressure of the fuel gas, wherein a volume of the sub tank is less than a volume of the main tank and the volume of the sub tank is 30% or less of a total volume of the main tank and the sub tank, the fuel cell system further comprising a fuel cell electronic control device including a switching valve control apparatus and an adhesion detection apparatus configured to detect adhesion in a closed state of the second switching valve based on a change of a detection value of the pressure sensor in a second switching valve open state immediately following a double switching valve open state, where in the second switching valve open state the first switching valve is closed in response to an OFF signal from the switching valve control apparatus, the second switching valve is opened, and the fuel cell generates power, and where in the double switching valve open state the first switching valve is opened and the second switching valve is opened in response to an ON signal from the switching valve control apparatus, and the fuel cell generates power.

* * * * *